United States Patent
Kataria et al.

(10) Patent No.: US 7,971,247 B2
(45) Date of Patent: Jun. 28, 2011

(54) METHODS AND APPARATUS FOR PREVENTION OF EXCESSIVE CONTROL MESSAGE TRAFFIC IN A DIGITAL NETWORKING SYSTEM

(75) Inventors: Deepak Kataria, Edison, NJ (US); Seong-Hwan Kim, Allentown, PA (US); Sundar Vedantham, Orwigsburg, PA (US)

(73) Assignee: Agere Systems Inc., Allentown, PA (US)

( * ) Notice: Subject to any disclaimer, the term of this patent is extended or adjusted under 35 U.S.C. 154(b) by 1376 days.

(21) Appl. No.: 11/459,035

(22) Filed: Jul. 21, 2006

(65) Prior Publication Data

US 2008/0037441 A1 Feb. 14, 2008

(51) Int. Cl.
*H04L 9/32* (2006.01)
(52) U.S. Cl. ............................................ 726/22; 726/23
(58) Field of Classification Search .............. 726/22–30; 713/150–154; 709/219, 223, 224–225, 227, 709/229
See application file for complete search history.

(56) References Cited

U.S. PATENT DOCUMENTS 7,502,926 B2 * 3/2009 Luo et al. ...................... 713/163

OTHER PUBLICATIONS

Tut Systems, Inc., "VideoTele.com Debuts Astria™ Video Services Switch for Delivering Digital TV Over Existing xDSL Networks," Press Release, 2 pages, May 28, 2003.
Paradyne Networks, Inc., "Paradyne Networks and VideoTele.com Announce Video Alliance," Press Release, 2 pages, Jun. 4, 2003.

* cited by examiner

*Primary Examiner* — Hosuk Song
(74) *Attorney, Agent, or Firm* — Ryan, Mason & Lewis, LLP

(57) ABSTRACT

Methods and apparatus for use with an integrated circuit device of a processing device of a network node of a digital networking system, configured to monitor one or more control messages received at the processing device from each of a plurality of CPE devices, and limiting the one or more control messages to one or more specified rates for a specified duration. The integrated circuit device is further configured to provide one or more data channels to the plurality of CPE devices from the processing device in response to the one or more control messages processed at the processing device.

28 Claims, 5 Drawing Sheets

| PORT | EN0 | CHANNEL0 | EN1 | CHANNEL1 | EN2 | CHANNEL2 | EN3 | CHANNEL3 |
|---|---|---|---|---|---|---|---|---|
| 0 | 1 | 11 | 1 | 11 | 1 | 3 | 1 | 10 |
| 1 | 0 | - | 0 | - | 0 | | 0 | - |
| 2 | 1 | 1 | 1 | 2 | 1 | 4 | 1 | 14 |
| 3 | 1 | 2 | 1 | 3 | 1 | 5 | 1 | 100 |
| 4 | 1 | 3 | 1 | 4 | 1 | 6 | 1 | 10 |
| ... | | | | | | | | |
| ... | 1 | 4 | 1 | 1 | 1 | 7 | 1 | 14 |
| 123 | 0 | - | 0 | - | 0 | - | 0 | - |

FIG. 4

METHODS AND APPARATUS FOR PREVENTION OF EXCESSIVE CONTROL MESSAGE TRAFFIC IN A DIGITAL NETWORKING SYSTEM

FIELD OF THE INVENTION

The present invention relates generally to the field of digital networking systems and, more particularly, to improved techniques for regulating control message traffic in a digital networking system.

BACKGROUND OF THE INVENTION

Traditional data channel transmission techniques include for example, data channel multicasting, which may be employed in a digital networking system, such as, for example, a digital subscriber line access multiplexer (DSLAM) network. A DSLAM network provides an end user, at a terminal or other endpoint, with the ability to switch between streams of data, or data channels, received from an upstream source. A DSLAM network is typically designed to accommodate a variety of different types of data channels, such as, for example, a number of video channels as well as channels associated with user data, voice and gaming traffic. The endpoints of a DSLAM network are customer premises equipment (CPE) devices, such as, for example, modems, set top boxes (STBs) or other processing devices, at a residence or business. A DSLAM network enables the delivery of any of the available video channels to an end user while simultaneously allowing the end user to use the data, voice and gaming channels.

An end user may select one video channel from a set of channels that are broadcasting at a given time, for example, by interacting with an STB using a remote control. An Internet group multicast protocol (IGMP) signal has traditionally been used to effect this channel selection by sending an IGMP control message from the CPE device of the end user through the DSLAM network and to a broadband remote access server (B-RAS). The channel selection is conveyed upstream in order to effect the switch to a newly selected channel. Since the signal has to travel from the CPE device and through the network to the B-RAS, a great number of messages may be traveling through the network at any given time. In DSLAM applications utilizing a central office (CO), the CO in the network polls for IGMP control messages. A CO may support a large number of CPEs, thus, IGMP consolidation presents a significant challenge to the efficiency of the system.

If the CPEs that generate the IGMP messages are compromised via software virus infection or hardware malfunction, they may be orchestrated to send in endless IGMP messages, overwhelming the B-RAS. A Denial of Service (DoS) attack aims to prevent legitimate users from obtaining services from desired resources by flooding the network with unwanted malicious traffic. This flooding overloads the service provider, thereby preventing services from being delivered. In a Distributed Denial of Service (DDoS) attack, the attack process takes over several devices on the network and coordinates them to attack the targeted network at the same time.

In the case of Internet protocol television (IPTV), malicious CPEs could be forced to send out endless IGMP join/leave messages upstream as if individual TV viewers are switching the channels continuously. Such an IGMP flood attack from malicious CPEs can overwhelm the network. Classic DDoS scenarios disrupt traffic flow on the network and deny services that the end user is paying for. In networks that handle voice, video and data using a single network infrastructure, this vulnerability can disrupt all three services at the same time.

Conventional techniques fail to adequately address this problem of a DoS attack on such a digital networking system. Thus, in order to prevent DoS scenarios, techniques for monitoring and limiting control messages are needed.

SUMMARY OF THE INVENTION

The present invention in an illustrative embodiment prevents excessive control message traffic in a digital networking system, thereby decreasing the likelihood of a DoS scenario.

In accordance with one aspect of the invention, an integrated circuit device for use in a processing device of a network node of a digital networking system is configured to monitor one or more control messages received at the processing device from each of a plurality of CPE devices, and limit the one or more control messages to one or more specified rates for a corresponding specified duration. The integrated circuit device is further configured to provide one or more data channels to the plurality of CPE devices from the processing device in response to the one or more control messages processed at the processing device.

In an additional embodiment of the present invention, the one or more control messages may be limited to at least a first specified rate and a second specified rate. A corresponding specified duration for the first specified rate may be shorter than a corresponding specified duration for the second specified rate.

An apparatus in accordance with this aspect of the present invention, used in a network node of digital networking system, comprises at least one processing device. The at least one processing device comprises an integrated circuit device that is configured to monitor one or more control messages received at the at least one processing device from each of a plurality of CPE devices, and limit the one or more control messages to one or more specified rates for a corresponding specified duration. The integrated circuit device is further configured to provide one or more data channels to the plurality of CPE devices from the at least one processing device in response to the one or more control messages processed at the at least one processing device.

A method of preventing excessive control message traffic in a digital networking system in accordance with this aspect of the present invention comprises the monitoring of one or more control messages received at a processing device of a network node of the digital networking system from each of a plurality of CPE devices, and the limiting of the one or more control messages to one or more specified rates for a corresponding specified duration. The method further comprises the providing of one or more data channels to the plurality of CPE devices from the processing device in response to the one or more control messages processed at the processing device.

Advantageously, an illustrative embodiment of the present invention ensures channel selection and switching at the line card, thereby reducing the control message traffic in the digital networking system. Each data channel is fed to the DSLAM CO and to the individual line cards. The embodiments of the present invention may take advantage of large capacity backplane devices and an access network. By policing the rate of incoming control messages at the line card, compromised CPEs are prevented from overloading the digital networking system with excessive control messages.

These and other features and advantages of the present invention will become apparent from the following detailed description of the illustrative embodiments thereof which is to be read in connection with the accompanying drawings.

BRIEF DESCRIPTION OF THE DRAWINGS

FIG. 4 is a table illustrating channel selection at CPE devices in a DSLAM network, according to an embodiment of the present invention.

DETAILED DESCRIPTION

As will be described in detail below, the present invention in the illustrative embodiment relates generally to the field of digital networking systems and, more particularly, to improved techniques preventing excessive traffic of control messages on the digital networking system.

Figure 1:
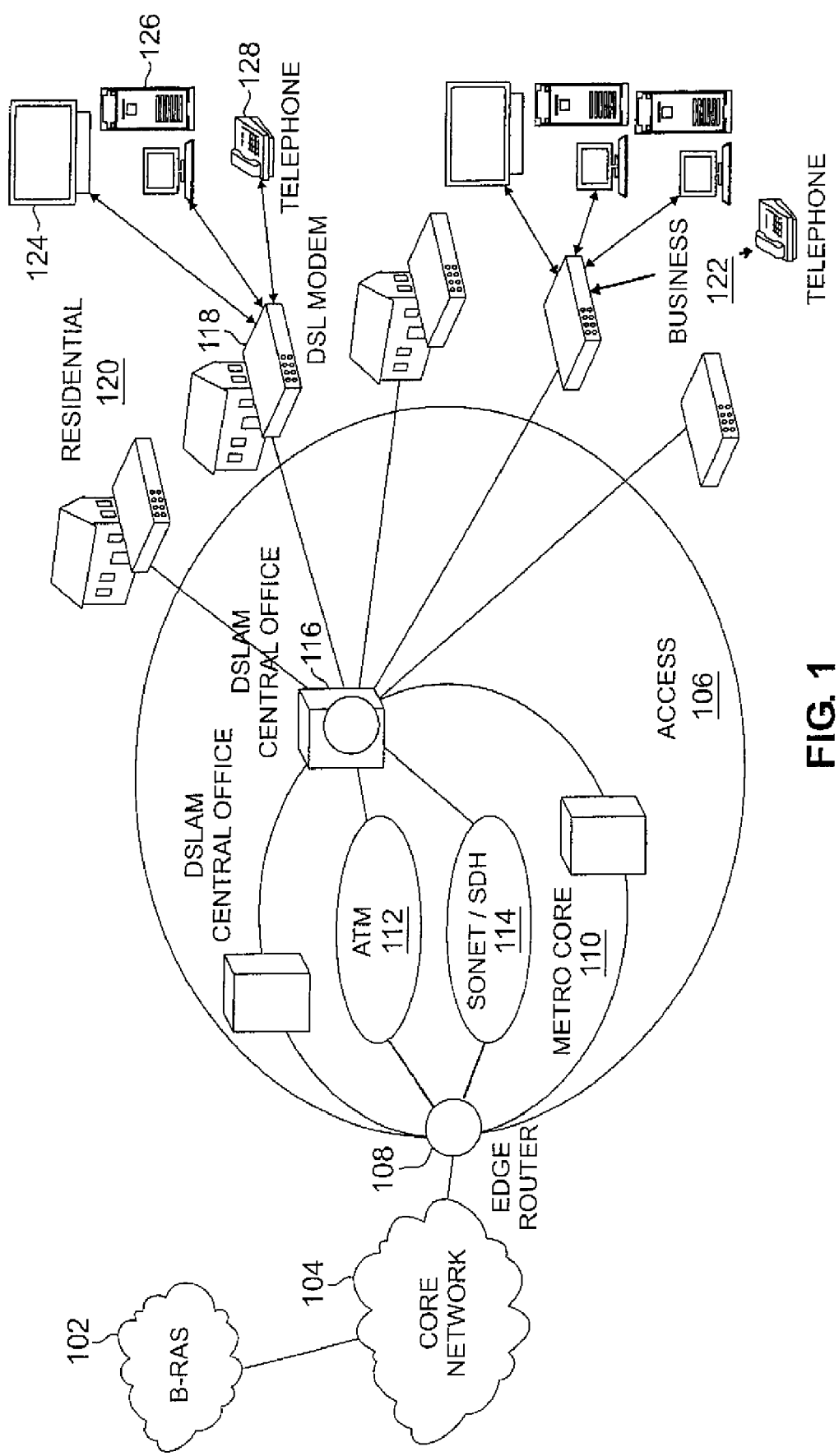
FIG. 1 is a diagram illustrating a DSLAM network, according to an embodiment of the present invention.

Referring initially to FIG. 1, a diagram illustrates a DSLAM network, according to an embodiment of the present invention. A plurality of data channels, for example, video channels, are sent from the far end of the network at B-RAS 102, through a core network 104 and into an access network 106. Core network 104 is in communication with access network 106 through an edge router 108. Edge router 108 may communicate with a network node, or more specifically, CO 116, through a metro core 110 of access network 106 via an asynchronous transfer mode (ATM) 112, synchronous optical network (SONET) or synchronous digital hierarchy (SDH) 114. SONET is the United States version of synchronous data transmission over fiber optic networks, while SDH is the international version of the standard. Edge router 108 may provide communication to and from several DSLAM COs through metro core 110 of access network 106. DSLAM CO 116 is in communication with DSL modems 118 at residences 120 and businesses 122 for use, for example, with a television 124, computer 126, or telephone 128.

Through the DSLAM network provided in FIG. 1, the plurality of data channels may be transmitted to CO 116 for individual distribution to devices 124, 126 and 128, through DSL modems 118, in response to control messages sent from modems 118, to B-RAS 102, and intercepted by CO 116.

Figure 2:
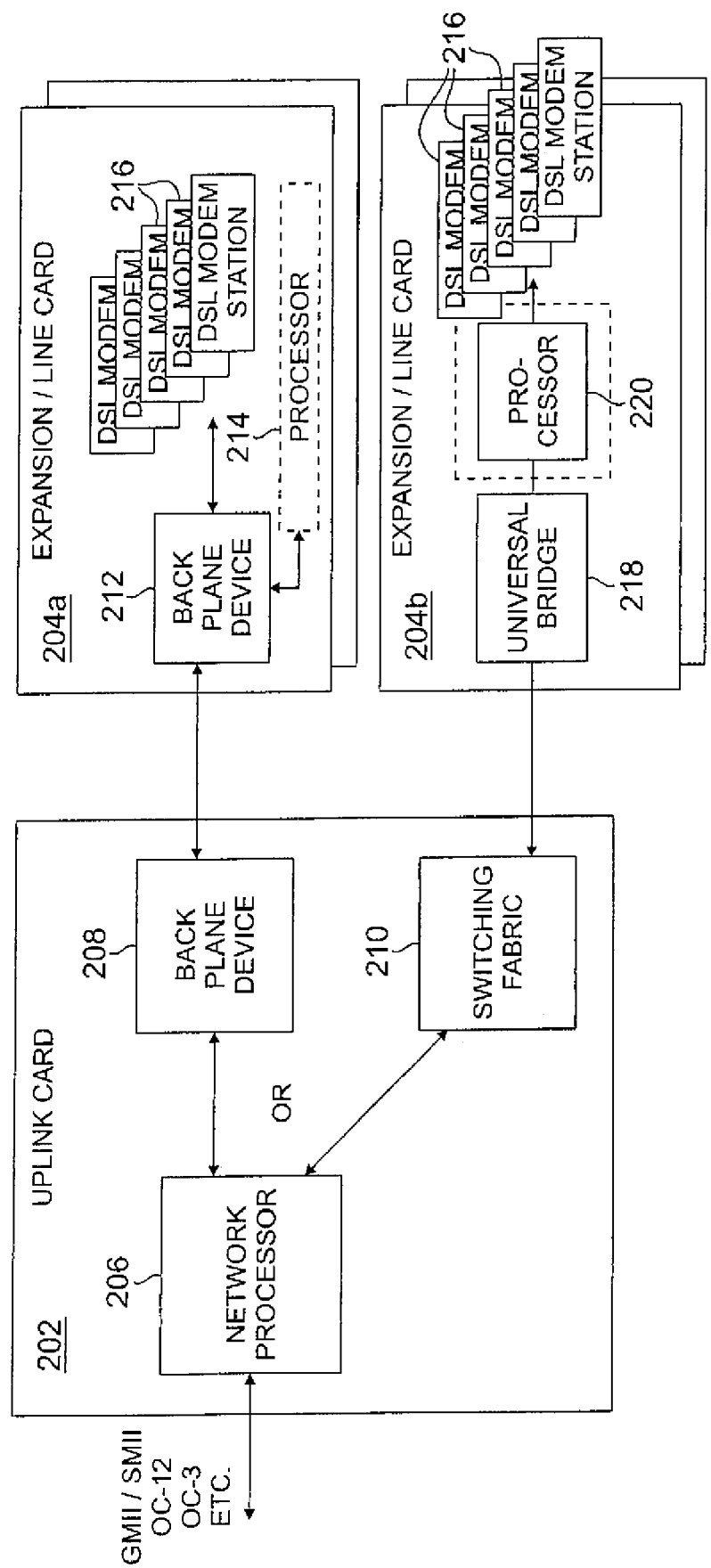
FIG. 2 is a diagram illustrating a general DSLAM CO architecture, according to an s embodiment of the present invention.

Referring now to FIG. 2, a diagram illustrates a general DSLAM CO architecture, according to an embodiment of the present invention. This may be considered a more detailed view of DSLAM CO 116 of FIG. 1. An uplink card 202 communicates with at least one line card 204a, 204b, or an alternative processing device. In this embodiment, uplink card 202 provides communication with upstream components of the DSLAM network through, for example, gigabit media independent interface (GMII) or serial media independent interface (SMII), through, for example, optical carrier 12 (OC-12, 622.08 Mbps) or optical carrier 3 (OC-3, 155.52 Mbps), at ATM or multi-protocol network processor 206.

Network processor 206 may communicate with a backplane device 208 or a switching fabric 210 within uplink card 202. Uplink card 202 having backplane device 208, and uplink card 202 having switching fabric 210, represent two separate embodiments of the present invention. If backplane device 208 is implemented in uplink card 202, uplink card 202 communicates with one or more line cards 204a, each having a backplane device 212. Backplane device 212 may utilize a processor 214 in order to implement the invention. Backplane device 212 communicates with DSL modems through DSL modem stations 216. The communication through DSL modem stations allows CPE devices to provide signals for interception by line card 204a, and allows line card 204a to transmit a requested data channel to a requesting CPE device.

If switching fabric 210 is implemented in uplink card 202, uplink card 202 communicates with one or more line cards 204b, each having a universal bridge (UB) 218. UB 218 utilizes a processor 220 in implementing the invention and communicating with DSL modem stations 216 of line card 204b. DSL modem stations 216, modems and CPE devices perform similar functions in embodiments utilizing line cards 204a and 204b.

Processors 214, 220 of line cards 204a, 204b may perform fine grained policing of upstream traffic flow received from CPE devices. Control messages received from any given CPE equipment may be limited to a specified rate, such as, for example, one to two messages per second. This allows legitimate user channel change requests to be processed properly. If the channel switch requests continue at a specified rate for a specified duration, such as, for example, beyond one minute, the CPE device can be dropped since normal users will not be changing channels that rapidly for that extended period of time. This rule assists in isolating regular user requests from DDoS attack messages.

Processors 214, 220 of line cards 204a, 204b may also perform a multiplexing operation where traffic received from multiple CPE devices is aggregated. The aggregated traffic is also policed to ensure that flooding control messages are filtered out so that they do not reach the provider network. In aggregated situations, the limits utilized in policing are programmed in accordance with the number of CPE devices utilized in the aggregation.

Figure 3:
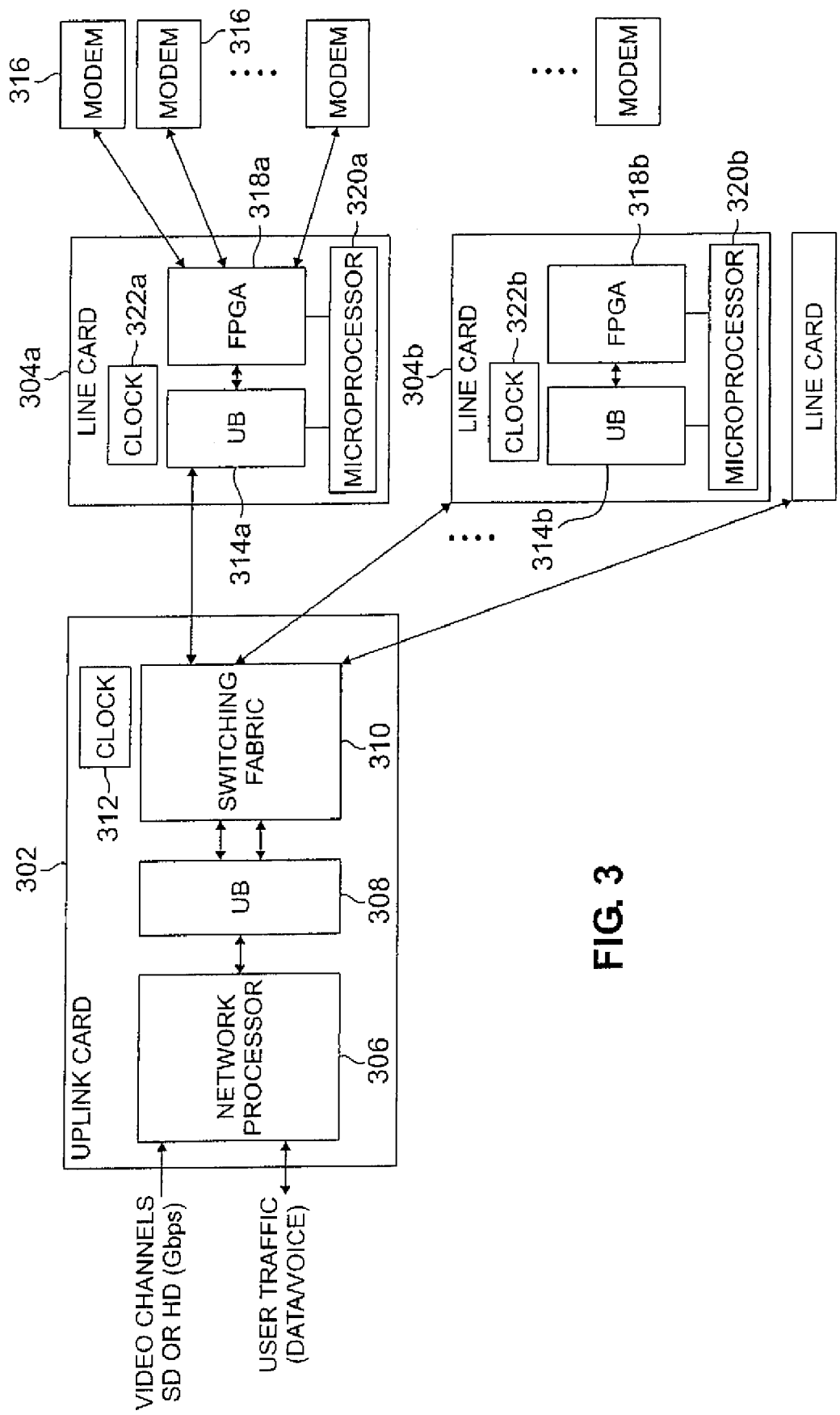
FIG. 3 is a diagram illustrating a more detailed example implementation of the FIG. 2 arrangement, according to an embodiment of the present invention.

As shown in FIG. 3, a diagram illustrates a more detailed example implementation of the FIG. 2 arrangement, according to an embodiment of the present invention. More specifically, this may be considered a detailed description of the general DSLAM CO architecture implementing a switching fabric in an uplink card. An uplink card 302 receives data channels and communicates user traffic through a network processor 306, which corresponds to network processor 206 in FIG. 2. Network processor 306 may be implemented using any of the Agere Payload Plus (APP) family of devices, commonly available from Agere Systems Inc., of Allentown, Pa., USA. Network processor 306 is in communication with a UB 308, which communicates with switching fabric 310. In this embodiment of the present invention, UB 308 may be implemented as part UB2GSNP and switching fabric 310 may be implemented as parts PI40SAX, PI20SAX, which are also commonly available from Agere Systems Inc. Uplink card 302 also includes a clock 312. Uplink card 302 transmits channels to one or more line cards 304, while also receiving necessary user traffic.

In line card 304a, a UB 314a communicates with uplink card 302 through switching fabric 310. UB 314a is also in communication with FPGA 318a and microprocessor 320a within line card 304a in order to implement the invention. Line card 304a communicates with modems 316 through FPGA 318a. The channels are transmitted to FPGA 318a from uplink card 302 and a control message is transmitted to FPGA 318a from a modem 316. A similar communication system exists with regard to line card 304*b*, UB 314*b*, FPGA 318*b*, and microprocessor 320*b*. Both line cards 304*a*, 304*b* also include respective clocks 322*a*, 322*b*.

FPGA 318*a*, 318*b* in communication with processor 320*a*, 320*b* may be considered a management device of line card 304*a*, 304*b*. Such a management device of the line card may be viewed as one example of an integrated circuit device that implements the present invention. The management device maintains a table, as shown in FIG. 4. The table may be stored in an internal memory of the management device or an associated external memory. The table illustrates the channel selection at CPE devices for a specific line card. This table is used to provide and manage requested data channels for appropriate end users. When an end user at a CPE device switches a channel, the CPE device generates a control message, for example, IGMP, that is intended to be destined to the far-end server, B-RAS. The management device in the line card of the CO intercepts the control message and uses it to dynamically update the table and provide the requested channel to the CPE device. The management device is able to provide the data channel because every data channel is transmitted to the CO and transmitted to the individual line cards that comprise the management device.

The table is updated dynamically, utilizing in this embodiment a one-to-one signaling between the CPE device and the management device. An identification number of the data channel must be obtained from the control message sent from the CPE device. The table maintains the data channel ID, for example, a TV channel number, of the data channel requested by and transmitted to the CPE device. In addition, the table includes an enable/disable bit for each CPE device associated with the line card, to indicate whether it is on or off. The port column in the table represents the DSL modems at each residence or business. The table in FIG. 4 illustrates 124 modems, each capable of supporting 4 CPE devices, for example, 4 set-top channel boxes in each house. Additional embodiments of the management device of the line card may maintain a table having 48 or 64 DSL modems.

Figure 5:
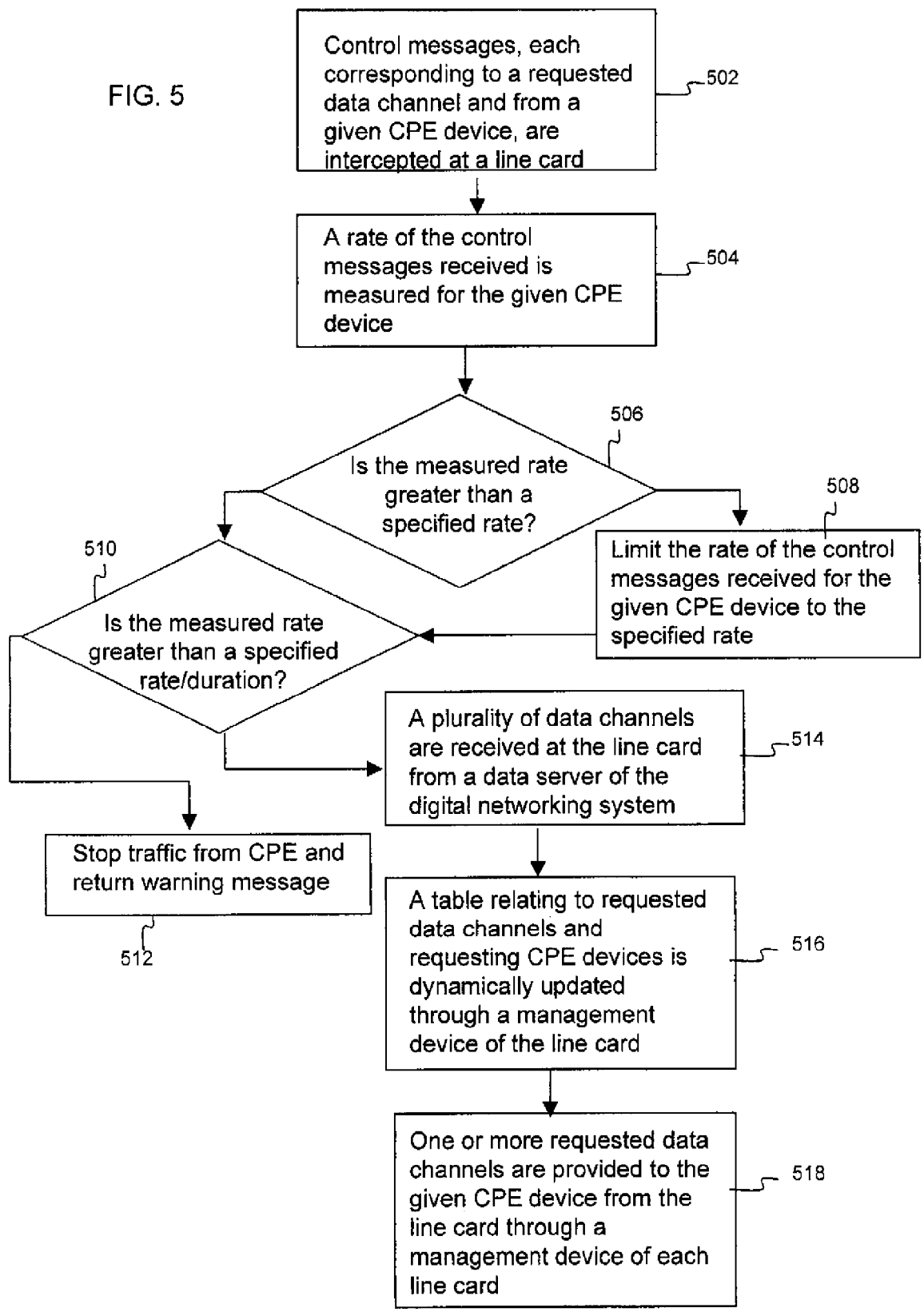
FIG. 5 is a flow diagram illustrating an excessive control message prevention methodology in a DSLAM network, according to an embodiment of the present invention.

As shown in FIG. 5, a flow diagram illustrates an excessive control message prevention methodology at a line card of a DSLAM network, according to an embodiment of the present invention. The methodology begins in block 502, where control messages, each corresponding to a requested video channel and from a given CPE device, are snooped at a line card. In block 504 a rate, such as, for example, a fine grained flow, of the one or more control messages received is measured for the given CPE device. In block 506, it is determined if the rate of the control messages is greater than a specified rate for a specified duration. If the rate of control messages received by the line cards is greater than the specified rate for the given CPE device, the rate of control messages is limited to the specified rate in block 508, and the methodology continues at block 510. If the rate of the control messages received by the line cards is not greater than the specified rate for the given CPE device, the methodology continues at block 510.

In block 510, it is determined if the rate of the control messages is greater than a specified rate for a second duration. If the rate is greater than the specified rate for the second specified duration, traffic from the given CPE device is stopped and a warning message is returned in block 512. If the rate is not greater than the specified rate for the second specified duration the methodology continues at block 514, where a plurality of video channels are received at the line card from a data server of the digital networking system. In block 516, a table relating to requested data channels and requesting CPE devices is dynamically updated through the integrated circuit device of the line card. Finally, in block 518, one or more requested video channels are provided to the given CPE device from the line card through an integrated circuit device of the line card, terminating the methodology. The methodology may be continuously and simultaneously run for each CPE device of the digital network.

For example, in accordance with the methodology described above, a channel change may not be permitted from a single CPE device if a gap between IGMP messages is less than 10 milliseconds (msec). This may be considered short rate monitoring. Further, if the channel change messages occur 20 messages per second for a ten minute period, no channel changes are then permitted for ten minutes and a warning is sent to the CPE device. This may be considered frequency monitoring for a long period of time.

Accordingly, as described herein, the present invention in the illustrative embodiment prevents excessive control message traffic in a digital networking system through effective data channel selection and control message policing techniques.

Additional embodiments of the present invention may incorporate multiple numbers and combinations of COs, DSL modems, CPE devices and other elements. These embodiments may also incorporate different numbers and combinations of line cards associated with a single uplink card in the COs. The tables described above in each line card are based on the number of modems the line card communicates with and the number of CPE devices associated with each modem. Therefore, the number of ports and channels provided in the table may also differ in additional embodiments.

In a specific embodiment of the present invention an ASIC device may be utilized in place of the FPGA device. Further, proprietary signaling from another application may be utilized in place of IGMP. The invention may be implemented using any type of control messages. Finally, the invention is not limited to uplink card-line card configurations in the CO of the illustrative embodiments. The invention may also apply, for example, to single hierarchy configurations where only a line card is utilized, as well as to other arrangements.

As discussed above, the management device of the present invention may be considered an integrated circuit device. Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Therefore, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An integrated circuit device for use in a processing device of a network node of a digital networking system, wherein the integrated circuit device is configured to monitor one or more control messages received at the processing device from each of a plurality of customer premises equipment (CPE) devices, limit the one or more control messages to one or more specified rates for a corresponding specified duration, and provide one or more data channels to the plurality of CPE devices from the processing device in response to the one or more control messages processed at the processing device.

2. The integrated circuit device of claim 1, wherein the integrated circuit device is further configured to intercept the one or more control messages from each of the plurality of CPE devices corresponding to one or more requested data channels, receive a plurality of data channels comprising at least the one or more requested data channels from a data server of the digital networking system, and provide the one or more requested data channels to each of the plurality of CPE devices.

3. The integrated circuit device of claim 1, wherein the one or more specified rates comprise at least a first specified rate and a second specified rate, and wherein a corresponding specified duration for the first specified rate is shorter than a corresponding specified duration for the second specified rate.

4. The integrated circuit device of claim 1, comprising a field programmable gate array device.

5. The integrated circuit device of claim 1, comprising an application-specific integrated circuit (ASIC) device 6. The integrated circuit device of claim 1, wherein each of the one or more control messages comprises an Internet group multicast protocol signal.

7. The integrated circuit device of claim 1, wherein the processing device comprises a line card.

8. The integrated circuit device of claim 7, wherein the integrated circuit device is adapted to be in communication with a backplane device of the line card that is adapted to be in communication with a backplane device of an uplink card and configured to provide the plurality of data channels to the integrated circuit device.

9. The integrated circuit device of claim 8, wherein the integrated circuit device is adapted to be in communication with a processor that is adapted to be in communication with the backplane device of the line card.

10. The integrated circuit device of claim 7, wherein the integrated circuit device is adapted to be in communication with a universal bridge of the line card that is adapted to be in communication with a switching fabric of an uplink card and configured to provide the plurality of data channels to the integrated circuit device.

11. The integrated circuit device of claim 10, wherein the integrated circuit device is adapted to be in communication with a processor that is adapted to be in communication with the universal bridge of the line card.

12. The integrated circuit device of claim 1, wherein the integrated circuit device is adapted to be in communication with one or more modem stations for communication with one or more modems in association with each of the plurality of CPE devices.

13. An apparatus for use in a network node of a digital networking system comprising at least one processing device comprising an integrated circuit device configured to monitor one or more control messages received at the at least one processing device from each of a plurality of customer premises equipment (CPE) devices, limit the one or more control messages to one or more specified rates for a corresponding specified duration, and provide one or more data channels to the plurality of CPE devices from the at least one processing device in response to the one or more control messages processed at the at least one processing device.

14. The apparatus of claim 13, wherein the one or more specified rates comprise at least a first specified rate and a second specified rate, and wherein a corresponding specified duration for the first specified rate is shorter than a corresponding specified duration for the second specified rate.

15. The apparatus of claim 13, wherein the at least one processing device comprises at least one line card.

16. The apparatus of claim 15, further comprising an uplink card adapted to be in communication with the at least one line card, and configured to receive the plurality of data channels from the data server of the digital networking system and transmit the plurality of data channels to the at least one line card.

17. The apparatus of claim 16, wherein the uplink card comprises a multi-protocol network processor and a backplane device in communication with the network processor.

18. The apparatus of claim 16, wherein the uplink card comprises a multi-protocol network processor and a switching fabric in communication with the network processor.

19. A method of preventing excessive control message traffic in a digital networking system comprising the steps of:
monitoring one or more control messages received at a processing device of a network node of the digital networking system from each of a plurality of customer premises equipment (CPE) devices;
limiting the one or more control messages to one or more specified rates for a corresponding specified duration;
providing one or more data channels to the plurality of CPE devices from the processing device in response to the one or more control messages processed at the processing device.

20. The method of claim 19, wherein, in the step of limiting the one or more control messages, the one or more specified rates comprise at least a first specified rate and a second specified rate, and wherein a corresponding specified duration for the first specified rate is shorter than a corresponding specified duration for the second specified rate.

21. The method of claim 19, wherein, in the step of limiting the one or more control messages, the one or more control messages received are aggregated and the one or more specified rates correspond to a number of CPE devices corresponding to the one or more aggregated control messages.

22. The method of claim 19, wherein the step of limiting the one or more control messages comprises the step of intercepting the one or more control messages, each corresponding to a requested data channel and from a CPE device, at the processing device.

23. The method of claim 22, wherein, in the steps of intercepting the one or more control messages and providing the one or more requested data channels, the one or more CPE devices are in communication with the processing device through a modem.

24. The method of claim 19, wherein the step of limiting the one or more control messages comprises the step of measuring a fine grained flow of the one or more control messages.

25. The method of claim 19, wherein the step of providing one or more data channels comprises the steps of:
receiving a plurality of data channels at the processing device of the network node from a data server of the digital networking system; and
providing the one or more requested data channels to the plurality of CPE devices from the processing device through an integrated circuit device of the processing device.

26. The method of claim 25, wherein the processing device comprises a line card.

27. The method of claim 26, wherein the step of receiving a plurality of data channels further comprises the step of receiving a plurality of data channels from a data server through an uplink card of the network node in communication with the line card.

28. A digital networking system comprising:
- a data server configured to transmit a plurality of data channels;
- one or more customer premises equipment (CPE) devices configured to transmit one or more control messages each corresponding to a requested data channel; and
- at least one network node comprising at least one processing device having an integrated circuit device configured to monitor one or more control messages received from each of the one or more CPE devices, limit the one or more control messages to one or more specified rates for a corresponding specified duration, and provide one or more data channels to one or more CPE devices in response to the one or more control messages processed at the at least one processing device.

* * * * *